United States Patent
Peter-Hoblyn et al.

[11] Patent Number: 6,023,928
[45] Date of Patent: Feb. 15, 2000

[54] METHOD FOR REDUCING EMISSIONS FROM A DIESEL ENGINE

[75] Inventors: Jeremy D. Peter-Hoblyn, Cornwall, United Kingdom; James M. Valentine, Fairfield, Conn.

[73] Assignee: Clean Diesel Technologies, Inc., Stamford, Conn.

[21] Appl. No.: 09/061,467

[22] Filed: Apr. 16, 1998

Related U.S. Application Data

[60] Provisional application No. 60/043,266, Apr. 17, 1997.

[51] Int. Cl.$^7$ .................................................... F01N 3/00
[52] U.S. Cl. ................................ 60/274; 60/311; 60/303; 44/359; 44/364
[58] Field of Search .............................. 60/274, 286, 301, 60/303, 311; 44/358, 359, 363, 364

[56] References Cited

U.S. PATENT DOCUMENTS

| | | | |
|---|---|---|---|
| 3,966,391 | 6/1976 | Hindin et al. | 431/7 |
| 4,891,050 | 1/1990 | Bowers et al. | 44/67 |
| 4,892,562 | 1/1990 | Bowers et al. | 44/67 |
| 5,034,020 | 7/1991 | Epperly et al. | 44/358 |
| 5,195,319 | 3/1993 | Stobbe | 60/303 |
| 5,215,652 | 6/1993 | Epperly | 208/140 |
| 5,248,251 | 9/1993 | Dalla Betta, et al. | 431/7 |
| 5,266,083 | 11/1993 | Peter-Hoblyn et al. | 44/358 |
| 5,449,387 | 9/1995 | Hawkins et al. | 44/364 |
| 5,497,620 | 3/1996 | Stobbe | 60/303 |
| 5,501,714 | 3/1996 | Valentine et al. | 44/358 |
| 5,758,496 | 6/1998 | Rao et al. | 66/295 |

FOREIGN PATENT DOCUMENTS

| | | |
|---|---|---|
| 92/07561 | 11/1992 | WIPO . |
| 94/11467 | 5/1994 | WIPO . |
| 95/02655 | 1/1995 | WIPO . |
| 95/06805 | 3/1995 | WIPO . |
| 95/33023 | 12/1995 | WIPO . |
| 96/12097 | 4/1996 | WIPO . |
| 96/21708 | 7/1996 | WIPO . |
| 97/04045 | 2/1997 | WIPO . |

OTHER PUBLICATIONS

Jelles, S.J. et al; "Diesel Particulate Control with Fuel Additives. Combination of Platinum and Cerium Fuel Additives at Ultra Low Dose Rate"; 22$^{nd}$ CIMAC Congress; Copenhagen, Denmark; May 19, 1998; pp. 1–8.

Jelles, S.J. et al; "Diesel Particulate Control. Application of an Activated Particulate Trap in Combination with Fuel Additives at an Ultra Low Dose Rate".; SAE Paper 1999–01–0113; International Congress and Exposition, Detroit MI, Mar. 1–4, 1999.

*Primary Examiner*—Thomas Denion
*Assistant Examiner*—Binh Tran
*Attorney, Agent, or Firm*—St. Onge Steward Johnston & Reens LLC

[57] ABSTRACT

Operation of a diesel engine with low particulate emissions is achieved. A diesel engine is equipped with a platinum-catalyzed particulate trap. The engine is operated with a blend of diesel fuel and a fuel-soluble cerium composition to reduce the balance point of the trap with reduced cerium content. Preferably, the fuel will also contain a fuel-soluble organo-platinum group metal compound, or an effective platinum group metal compound can be added to the exhaust or combustion air.

3 Claims, 1 Drawing Sheet

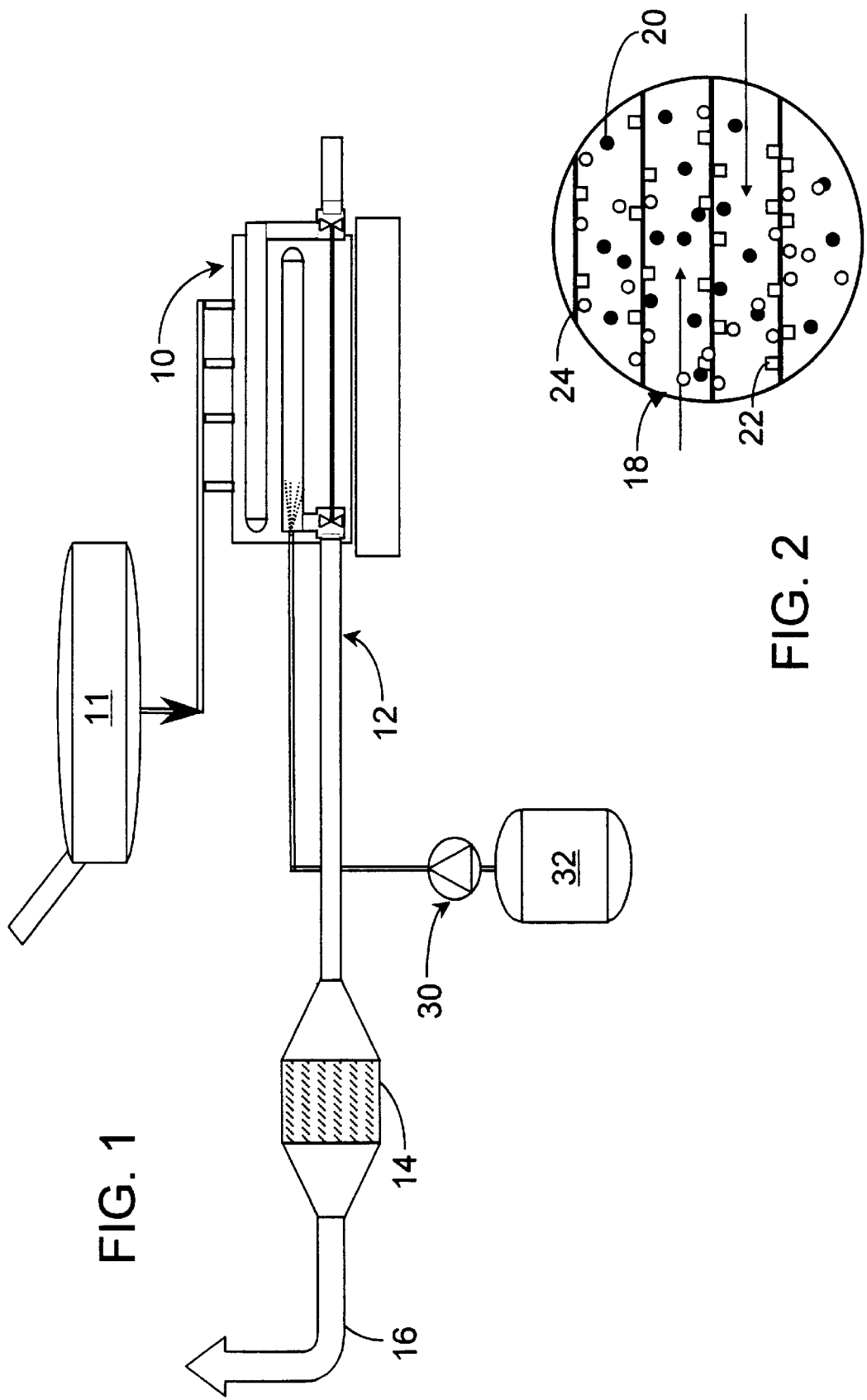

METHOD FOR REDUCING EMISSIONS FROM A DIESEL ENGINE

This application claims benefit of provisional application 60/043,266 filed Apr. 17, 1997.

TECHNICAL FIELD

The invention relates to methods that permit a diesel engine to operate efficiently with low particulate and $NO_x$ emissions.

The use of particulate traps for diesel engines has become common due to an inherent trade-off between $NO_x$ and particulates—when actions are taken to reduce one, the other increases. Conceptually, the use of a trap could permit $NO_x$ to be reduced to a great extent by techniques such as exhaust gas recirculation, engine timing adjustments, or other known technologies. However, the capture of particulates in a trap can be a problem due to loss in engine efficiency when the pressure drop across the trap becomes too high.

With current technology, the rapid build-up of particulates cannot be counteracted in a practical manner. Catalyzed traps—to aid in burn off of the particulates at practical, low temperatures—tend to be deactivated too rapidly to make them an economic solution. Similarly, fuel additives have not provided the complete answer.

DISCLOSURE OF INVENTION

It is an object of the invention to provide a method, which enables diesel engines to utilize particulate traps by reducing the balance point (steady state burn-off temperature), for the traps to a practically-low and sustainable level.

It is another object of the invention to provide a method that enables optimizing operation of a diesel for $NO_x$ reduction while dealing with particulates, e.g., PM 2.5.

It is another object of the invention to provide a method for passively regenerating a particulate trap with less fuel additives, e.g., cerium than previously effective.

It is another object of the invention to provide a method for enabling simultaneous reduction of particulates, unburned hydrocarbons and carbon monoxide from a diesel engine.

It is another object of the invention to provide a method that enables recovering the fuel economy penalty normally associated with a diesel particulate trap.

It is another object of the invention to provide a specific additive that can be added to diesel fuel at a suitable dosage to renew the activity of a catalyzed trap that has lost vigor.

It is another object of the invention to enable owners of old, but reliable vehicles with an easy and effective means for maintaining regulatory compliance.

It is a further object of the invention to provide a method for maintaining or renewing the activity of a catalyzed diesel particulate trap.

These and other objects are achieved by the present invention, which provides an improved method for operating a diesel engine with low particulate emissions.

The method of the invention comprises: equipping a diesel engine with a platinum-catalyzed particulate trap, and operating the engine with a blend of diesel fuel and a fuel-soluble cerium composition in an amount effective to reduce the balance point of the trap. Preferably, the fuel will also contain a fuel-soluble organo-platinum group metal compound, e.g., comprising a platinum group metal selected from the group consisting of platinum, palladium, rhodium and mixtures of two or more of these. In an alternative embodiment, an effective platinum group metal compound can be added to the exhaust gases before the trap or combustion air.

DESCRIPTION OF THE DRAWINGS

The invention will be better understood and its advantages will be more apparent when the following detailed description is read in light of the accompanying drawings, wherein:

FIG. 1 is a schematic representation of a diesel engine with an exhaust system including a particulate trap, catalyzed in accord with the invention; and FIG. 2 is an enlarged, cut-away schematic representation of a portion of a particulate trap utilized in accord with the invention.

DETAILED DESCRIPTION OF A PREFERRED EMBODIMENT

The term "Diesel engine" is meant to include all compression-ignition engines, for both mobile (including marine) and stationary power plants and of the two-stroke per cycle, four-stroke per cycle and rotary types.

The term "hydrocarbon fuel" is meant to include all of those fuels prepared from "distillate fuels" or "petroleum". The term "distillate fuel" means all of those products prepared by the distillation of petroleum or petroleum fractions and residues. The term "petroleum" is meant in its usual sense to include all of those materials regardless of source normally included within the meaning of the term, including hydrocarbon materials, regardless of viscosity, that are recovered from fossil fuels.

The term "diesel fuel" means "distillate fuels" including diesel fuels meeting the ASTM definition for diesel fuels or others even though they are not wholly comprised of distillates and can comprise alcohols, ethers, organo-nitro compounds and the like (e.g., methanol, ethanol, diethyl ether, methyl ethyl ether, nitromethane). Also within the scope of this invention, are emulsions and liquid fuels derived from vegetable or mineral sources such as corn, alfalfa, shale, and coal. These fuels may also contain other additives known to those skilled in the art, including dyes, cetane improvers, anti-oxidants such as 2,6-di-tertiary-butyl-4-methylphenol, corrosion inhibitors, rust inhibitors such as alkylated succinic acids and anhydrides, bacteriostatic agents, gum inhibitors, metal deactivators, upper cylinder lubricants, antiicing agents and the like.

Reference to FIG. 1 shows a diesel engine 10 fed fuel from a tank 11. The fuel is catalyzed with a suitable cerium compound and preferably also a platinum compound.

Among specific cerium compounds are: cerium III acetylacetonate, and various cerium soaps such as cerium III napthanate, cerium octoate, cerium steatate, cerium neodecanoate, and the like. Many cerium compounds are trivalent compounds meeting the formula: $Ce(OOCR)_3$, wherein R=hydrocarbon, preferably $C_2$ to $C_{22}$, and including aliphatic, alicyclic, aryl and alkylaryl. The dosage level will be at a level of from about 1 to 100 ppm cerium per million parts of fuel (mg per liter), and preferably in the range of from about 5 to 30 ppm. This level can be reduced significantly over what is currently employed by using the cerium in combination with a platinum-catalyzed particulate trap.

Exhaust from the engine will pass through exhaust pipe 12, carrying catalytic metals released from the fuel additive catalyst compositions of cerium, and preferably also platinum, to a catalyzed particulate trap 14. The trap can be catalyzed either as installed or by building up a catalyst deposit by operating the engine with a platinum group metal fuel additive. The trap 14 can be of conventional construction of a suitable heat-resistant material, e.g., a silica-alumina composition such as cordierite, silicon carbide, glass or metal fibers, porous glass or metal substrates, or the like. Platinum catalyzed traps are commercially available and have been reported in the literature to be effective at reducing the balance point. In addition to the use of platinum itself, other platinum group metals can be used, e.g., in combination. Traps of this type are within the contemplation of the invention (as also are those catalyzed by deposition of a platinum group metal by other means such as from a fuel additive) and enable the reduction of the balance point to a degree greater than with either the trap alone or an uncatalyzed trap with a cerium additive. Thus, the use of cerium with the catalyzed trap can provide balance point reduction with reduced cerium levels.

Reference to FIG. 2 schematically shows a section of a trap enlarged to illustrate the dynamics of the process. Channels 18 have about half of their number extending in the direction of flow of the exhaust gas (see arrow) with a like number extending in the opposite direction. The channels are closed at an end along the direction of exhaust gas flow with a side opening to an adjacent channel. The exact configuration of the channels differs depending on many design and manufacturing variables, but the important common factor is that the particulates (e.g., dots 20 in FIG. 2) are stopped from traversing and exiting the trap. These particulates must be burned off in the trap if the trap is going to continue to be effective. Hence, according to the invention, specific catalytic materials are used in a specific manner to assure a sustainably low balance point, e.g., within the range of from about 275 to about 400° C., and preferably below 325° C.

Referring again to FIG. 2, the trap is catalyzed with platinum, which is schematically represented as squares 22. Active species of cerium (represented in FIG. 2 as open circles 24), released upon combustion of the fuel, are carried by the exhaust for deposition within the channels 18. The combined effect of the cerium on the platinum-catalyzed trap significantly lowers the balance point in a manner not predictable.

As noted above, the fuel will preferably also contain a fuel-soluble organo-platinum group metal compound, e.g., of platinum, palladium or rhodium. Among these are platinum group metal compounds selected from the group consisting of platinum acetylacetonate and compounds having the general formula $XPtR_1R_2$ wherein X is a ligand containing at least one unsaturated carbon-to-carbon bond with an olefinic, acetylenic or aromatic pi bond configuration and $R_1$ and $R_2$ are, independently, benzyl, phenyl, nitrobenzyl or alkyl having 1 to 10 carbons, e.g., diphenyl cyclooctadiene platinum(II).

Suitable platinum group metal compounds are disclosed for example in prior U.S. Pat. Nos. 4,892,562 and 4,891,050 to Bowers and Sprague, U.S. Pat. No. 5,034,020 to Epperly and Sprague, U.S. Pat. No. 5,215,652 to Epperly, Sprague, Kelso and Bowers, and U.S. Pat. No. 5,266,083 to Peter-Hoblyn, Epperly, Kelso and Sprague, WO 90/07561 to Epperly, Sprague, Kelso and Bowers, and U.S. patent application Ser. No. 08/597,517, filed Jan. 31, 1996, by Peter-Hoblyn, Valentine and Sprague, hereby incorporated by reference. Where the application permits, a blend of these compounds can be used with one or more other platinum group metal compounds such as soaps, acetyl acetonates, alcoholates, β-diketonates, and sulfonates, e.g., of the type which will be described in more detail below.

The platinum group metal catalyst and/or other catalyst can be added in any manner effective for its intended purpose, such as by adding it to the fuel in bulk storage, to the fuel in a tank associated with the engine, or by continuous or intermittent addition, such as by a suitable metering device, e.g., 30 from tank 32 in FIG. 1, into: the fuel line leading to the engine, or in the form of a vapor, gas or aerosol into the air intake, the exhaust gases before the trap, exhaust gases after the trap but before recirculation to the engine, or a mixing chamber or equivalent means wherein the exhaust gases are mixed with incoming air.

When employed, platinum group metal catalyst compositions are preferably employed at concentrations of less than 1 part by weight of platinum group metal per million parts by volume fuel (ppm). When used for the purpose of catalyzing an uncatalyzed trap (or one that has become inactive), it is possible to higher doses, e.g., from 1 to 25 (or greater) ppm, to effect a rapid deposit of catalyst in the trap. For the purposes of this description, all "parts per million" figures are on a weight to volume basis, i.e., grams/million cubic centimeters (which can also be expressed as milligrams/liter), and percentages are given by weight, unless otherwise indicated. Auxiliary catalysts are employed at levels effective for their intended purpose, preferably at levels of from 1 to 200 ppm of the fuel utilized, e.g., 5 to 60 ppm.

The above description is for the purpose of teaching the person of ordinary skill in the art how to practice the present invention, and it is not intended to detail all of those obvious modifications and variations of it which will become apparent to the skilled worker upon reading this description. It is intended, however, that all such obvious modifications and variations be included within the scope of the present invention which is defined by the following claims. The claims cover the indicated components and steps in all arrangements and sequences which are effective to meet the objectives intended for the invention, unless the context specifically indicates the contrary.

I claim:

1. A method for operating a diesel engine with low particulate emissions, comprising:

equipping a diesel engine with a platinum-catalyzed particulate trap effective to trap particulates within channels therein as exhaust gases pass therethrough, the trap being catalyzed with platinum within said channels for trapping particulates prior to use such that the trap exhibits a balance point at an initial level, and operating the engine by combusting a blend of diesel fuel and a fuel-soluble cerium composition to release active species of cerium compounds into the exhaust which carries them into said channels catalyzed with platinum within said trap, the cerium composition being present in an amount effective to reduce the balance point of the trap from its initial level to a sustainable low level.

2. A method according to claim 1 wherein, the trap comprises a substrate of silica-alumina.

3. A method according to claim 1 wherein, a platinum compound is added to any one of the exhaust and combustion air before the trap to deposit catalytic platinum to channels in the trap wherein particulates are trapped.

* * * * *